United States Patent
Burke et al.

(10) Patent No.: US 9,250,392 B2
(45) Date of Patent: Feb. 2, 2016

(54) DETACHABLE INLET GUIDE FOR BLOWN OPTICAL FIBER

(71) Applicant: General Cable Technologies Corporation, Highland Heights, KY (US)

(72) Inventors: Michael J. Burke, Marshfield, MA (US); Hart A. Vandermeer, Uxbridge, MA (US); Michael R. Rainville, Bow, NH (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 14/537,008

(22) Filed: Nov. 10, 2014

(65) Prior Publication Data
US 2015/0131960 A1    May 14, 2015

Related U.S. Application Data

(60) Provisional application No. 61/902,442, filed on Nov. 11, 2013.

(51) Int. Cl.
*G02B 6/36* (2006.01)
*G02B 6/44* (2006.01)

(52) U.S. Cl.
CPC ............ *G02B 6/3616* (2013.01); *G02B 6/4459* (2013.01); *G02B 6/4464* (2013.01); *G02B 6/4472* (2013.01)

(58) Field of Classification Search
CPC .. G02B 6/3616; G02B 6/4459; G02B 6/4464; G02B 6/4472
See application file for complete search history.

(56) References Cited

U.S. PATENT DOCUMENTS

| 5,181,271 | A | * | 1/1993 | Jenkins | 385/135 |
|---|---|---|---|---|---|
| 5,781,678 | A | * | 7/1998 | Sano et al. | 385/45 |
| 6,364,290 | B1 | * | 4/2002 | Barker | 254/134.4 |
| 6,627,008 | B1 | * | 9/2003 | Taniguchi et al. | 148/403 |
| 7,457,499 | B2 | * | 11/2008 | Russert et al. | 385/115 |

(Continued)

FOREIGN PATENT DOCUMENTS

| JP | 5188236 A | | 7/1993 | | |
|---|---|---|---|---|---|
| JP | 05188236 A | * | 7/1993 | ............... | G02B 6/24 |

(Continued)

OTHER PUBLICATIONS

Copenheaver, Blaine R.; International Search Report and Written Opinion of the International Searching Authority, issued in International Application No. PCT/US2014/064924; dated as mailed on Mar. 6, 2015; 8 pages.

*Primary Examiner* — Peter Radkowski
(74) *Attorney, Agent, or Firm* — Ulmer & Berne LLP

(57) ABSTRACT

An inlet guide for facilitating distribution of optical fibers into at least one duct is provided. The inlet guide includes a first portion, a second portion, a first end, a second end, a head, and a main body. The first portion includes a first opposing surface. The second portion includes a second opposing surface and is separable from the first portion. The head is disposed at the first end and comprises an outlet port. The main body is disposed at the second end. The first portion and the second portion cooperate to define a plurality of passageways for the optical fibers. The plurality of passageways extends between the first end and the second end.

20 Claims, 7 Drawing Sheets

(56) References Cited

U.S. PATENT DOCUMENTS

| | | | |
|---|---|---|---|
| 7,756,381 B2 * | 7/2010 | Bleus et al. | 385/136 |
| 8,550,435 B2 * | 10/2013 | Gonen et al. | 254/134.4 |
| 2004/0071431 A1 * | 4/2004 | Trouchet et al. | 385/137 |
| 2009/0006429 A1 * | 1/2009 | Champion et al. | 707/100 |
| 2009/0026429 A1 | 1/2009 | Barker et al. | |
| 2010/0155681 A1 * | 6/2010 | Taylor et al. | 254/134.4 |

FOREIGN PATENT DOCUMENTS

| | | | | |
|---|---|---|---|---|
| WO | WO 2006103419 A1 * | 10/2006 | | G02B 6/44 |
| WO | 200777446 A1 | 7/2007 | | |

* cited by examiner

DETACHABLE INLET GUIDE FOR BLOWN OPTICAL FIBER

REFERENCE TO RELATED APPLICATION

The present application claims priority of U.S. provisional application Ser. No. 61/902,442, entitled DETACHABLE INLET GUIDE FOR BLOWN OPTICAL FIBER, filed Nov. 11, 2013, and hereby incorporates the same application herein by reference in its entirety.

TECHNICAL FIELD

The articles described below generally relate to the installation of blown optical fiber into a duct and in particular into a detachable inlet guide for facilitating such installation.

BACKGROUND

Air-assisted fiber installation, or blowing, is a technique for installing an optical fiber in a duct that offers an alternative to the conventional technique of threading a line through the duct, attaching the line to the fiber, and pulling or tugging the fiber through the duct. As the fiber is fed into the duct from a mechanical drive through an inlet guide, a high-pressure, high-volume air flow is introduced into the duct to push the fiber through the duct.

One known implementation of the inlet guide is a hydroscopic needle. However, the needles located at the inlet end are exposed to the mechanical drive and thus easily damaged. Also, the needles are susceptible to becoming filled with dirt, excess material, and/or other foreign substances which can clog the pathway and inhibit proper dispensation of the optical fibers therefrom.

FIGS. 1A and 1B illustrate a conventional inlet guide 100 that includes a cylindrical housing 102 having openings 104 at one end to receive fibers (not shown) and guides 106 at the other end for guiding the fibers into associated ducts (not shown). FIG. 1A is a rear perspective view depicting a conventional inlet guide. FIG. 1B is a front perspective view of the conventional inlet guide of FIG. 1A. The inlet guide 100 also has a flange 108 that defines a plurality of screw holes 110. The inlet guide 100 is attached to a housing of a feeding unit (not shown) with four screws (not shown) that are inserted through the screw holes 110. That particular arrangement accommodates between eight to twelve fibers and uses a point-over-point entry configuration which can cause crossover issues with the fibers entering the inlet guide 100 and can also cause friction thereby damaging the fibers during installation.

SUMMARY

In accordance with one embodiment, an inlet guide for facilitating distribution of optical fibers into at least one duct is provided. The inlet guide comprises a first portion, a second portion, a first end, a second end, a head, and a main body. The first portion comprises a first opposing surface. The second portion comprises a second opposing surface and is separable from the first portion. The head is disposed at the first end and comprises an outlet port. The main body is disposed at the second end. The first portion and the second portion cooperate to define a plurality of passageways for the optical fibers. The plurality of passageways extends between the first end and the second end.

In accordance with another embodiment, a system for facilitating distribution of optical fibers into at least one duct is provided. The system comprises a feeding unit and an inlet guide. The feeding unit is for guiding the fibers into the ducts. The inlet guide comprises a first portion, a second portion, a first end, a second end, a head, and a main body. The first portion comprises a first opposing surface. The second portion comprises a second opposing surface and is separable from the first portion. The head is disposed at the first end and comprises an outlet port. The main body is disposed at the second end. The first portion and the second portion cooperate to define a plurality of passageways for the optical fibers. The plurality of passageways extends between the first end and the second end.

In accordance with one embodiment, an inlet guide for facilitating distribution of optical fibers into at least one duct is provided. The inlet guide comprises a first portion, a second portion, a first end, a second end, a head, and a main body. The first portion comprises a first opposing surface. The second portion comprises a second opposing surface and is separable from the first portion. The head is disposed at the first end and comprises an outlet port. The main body is disposed at the second end. The first portion and the second portion cooperate to define a plurality of passageways for the optical fibers. The plurality of passageways extends between the first end and the second end. The plurality of passageways collectively tapers from the second end to the first end. The first portion and the second portion are each formed of a unitary one-piece construction.

BRIEF DESCRIPTION OF THE DRAWINGS

It is believed that certain embodiments will be better understood from the following description taken in conjunction with the accompanying drawings in which.

DETAILED DESCRIPTION

Figure 1A:
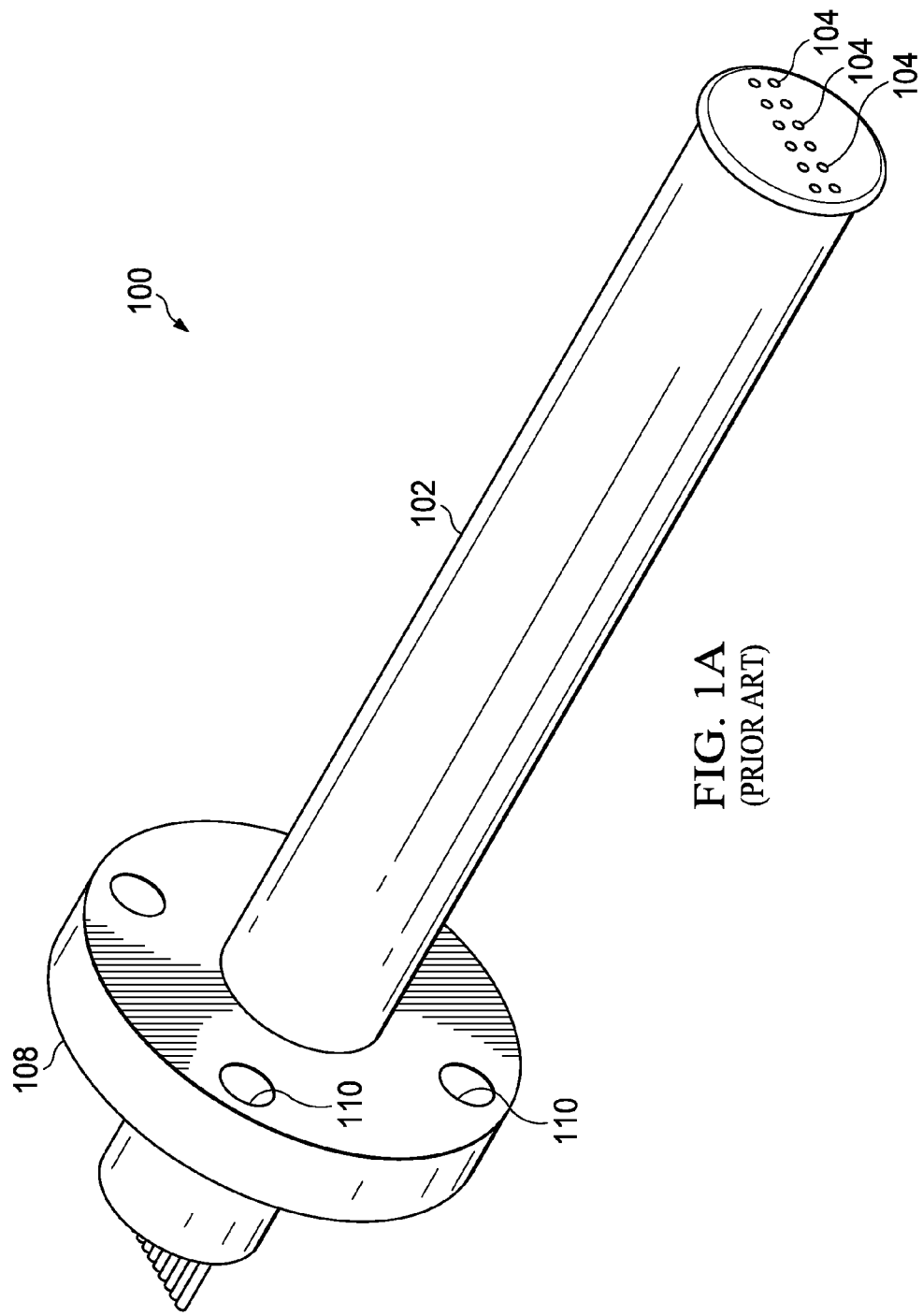
FIG. 1A is a rear perspective view depicting a conventional inlet guide.
Figure 1B:
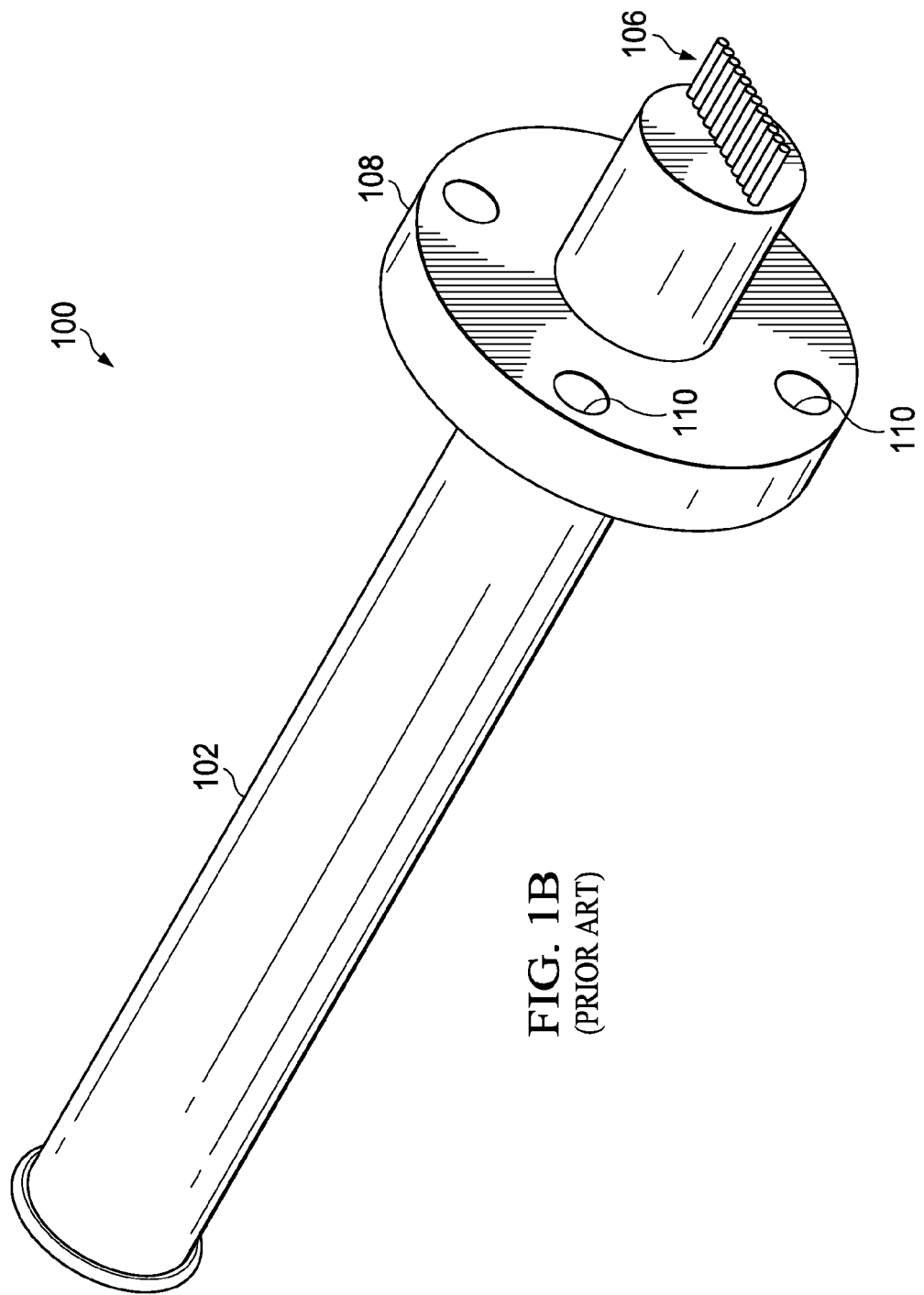
FIG. 1B is a front perspective view of the conventional inlet guide of FIG. 1A.
Figure 2:
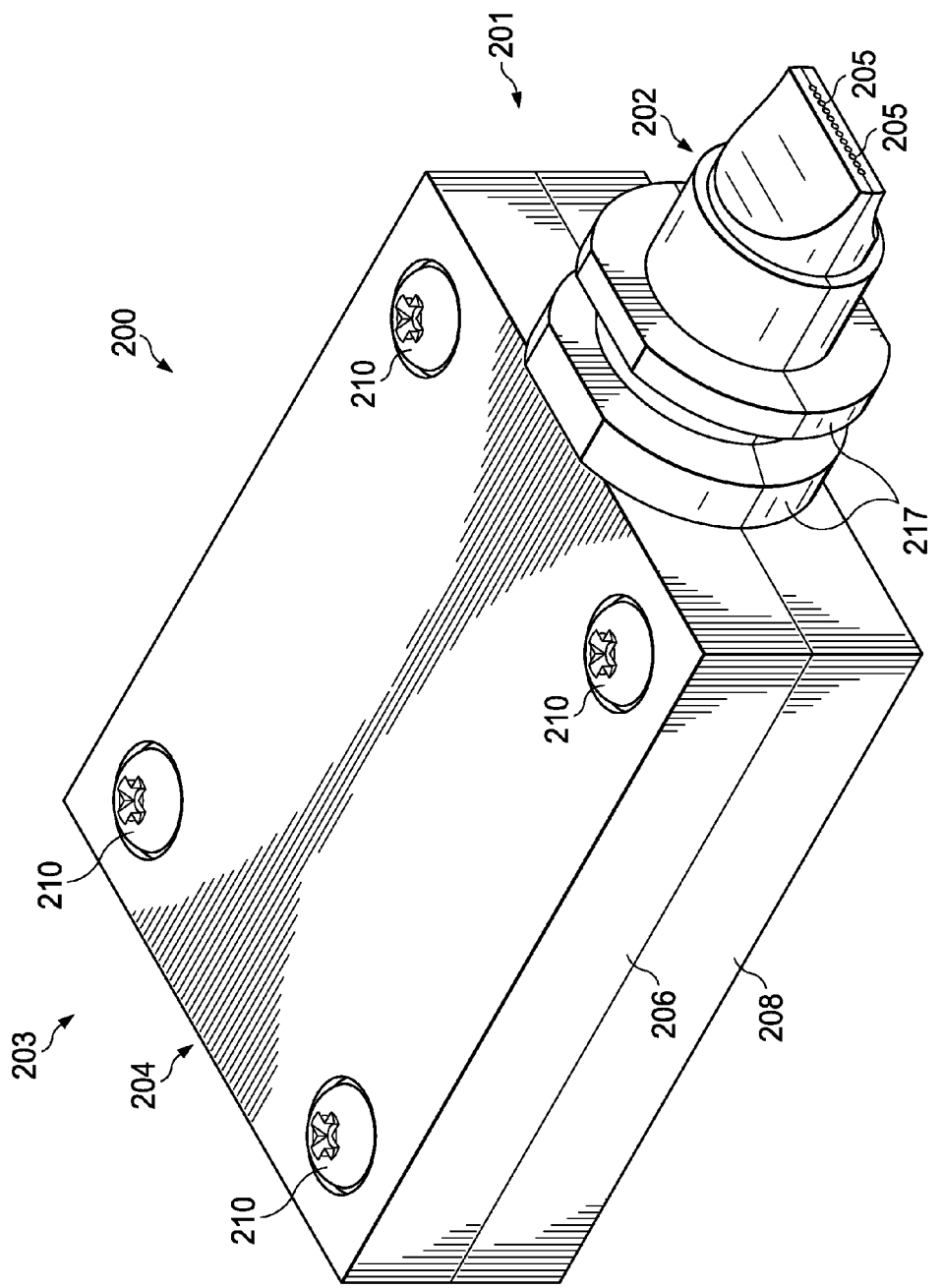
FIG. 2 is a front perspective view of an inlet guide according to one embodiment.
Figure 3:
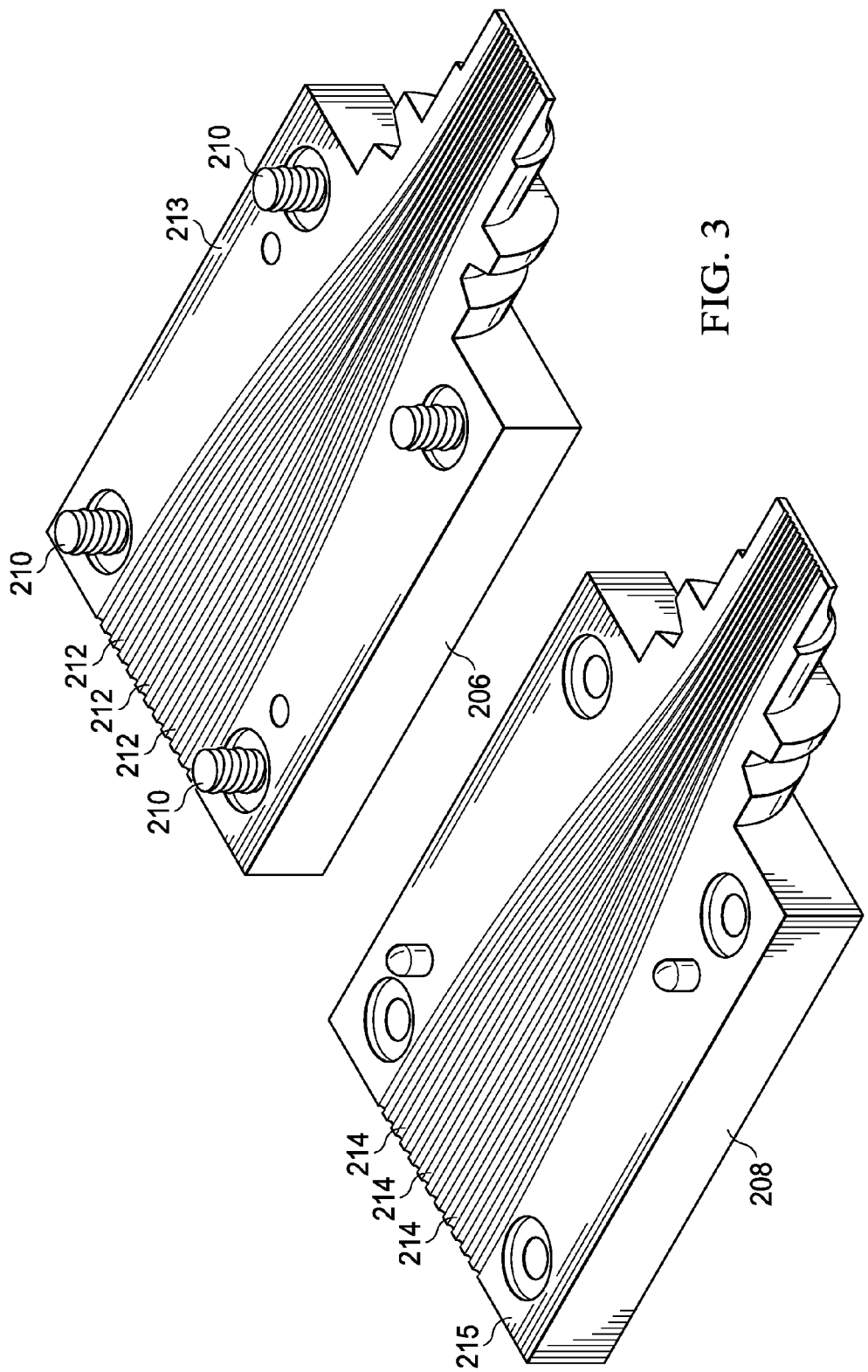
FIG. 3 is a perspective view of the inlet guide of FIG. 2 showing a disassembled configuration.

In connection with the views and examples of FIGS. 2-5B, wherein like numbers indicate the same or corresponding elements throughout the views, FIG. 2 is a perspective view showing an inlet guide 200 according to the one embodiment. The inlet guide 200 can include a main body 204 and a head 202 that extends from the main body 204. The head 202 can be disposed at a front end 201 of the inlet guide 200 and the main body 204 can be disposed at a rear end 203 of the inlet guide 200. The head 202 can interact with a feeding unit (e.g., 216 in FIG. 4) that facilitates the dispensation of optical wire through associated hollow ducts (not shown). The inlet guide 200 can be formed from any of a variety of materials such as, for example, aluminum, steel, or a thermoplastic. In one embodiment, as illustrated in FIG. 3, the inlet guide 200 can be a two-piece construction comprising an upper portion 206 and a lower portion 208 that are releasably secured together with screws 210. Each of the upper and lower portions 206, 208 can define a respective plurality of grooves 212, 214 which can be machined or otherwise formed onto respective inner (e.g., opposed) surfaces 213, 215 of the upper and lower portions 206, 208. When the upper and lower portions 206, 208 are secured together (e.g., with screws 210), the grooves 212, 214 cooperate to define a plurality of passageways through the inlet guide 200 and through which the optical fibers are permitted to travel. In another embodiment, only one of the halves 206, 208 can define a plurality of grooves.

Still referring to FIG. 3, the grooves 212, 214 are shown to be spaced further apart from each other at the rear end 203 of the inlet guide 200 than at the front end 201 of the inlet guide 200 such that the grooves 212, 214 converge (e.g., collectively taper) as they extend from the rear end 203 towards the front end 201. The inlet guide 200 thus allows for simplified construction, easy cleaning by separating the two halves 206, 208 to allow access to the grooves 212, 214, and aids in the prevention of cross-over during feeding of optical fibers therethrough.

In one embodiment, the upper and lower portions 206, 208 can be formed of a unitary one-piece construction, such as, for example, from cast aluminum. It will be appreciated that the upper and lower portions 206, 208 being described as a unitary one-piece construction should be understood to mean that the upper and lower portions 206, 208 are formed from a process that creates individual monolithic structures such as by casting, three-dimensional printing, or the like.

The main body 204 can define a plurality of apertures (207 in FIG. 4) that serve as a reception port into which optical fibers are received into the passageways. The head 202 can define a plurality of apertures (e.g., 205 shown in FIG. 2) that serve as an outlet port from which the optical fibers can be dispensed from the passageways. When the inlet guide 200 is installed on the feeding unit 216, as illustrated in FIG. 4, the plurality of apertures 205 can be in fluid communication with the passageways (not shown) routed through the inlet guide 200.

Figure 4:
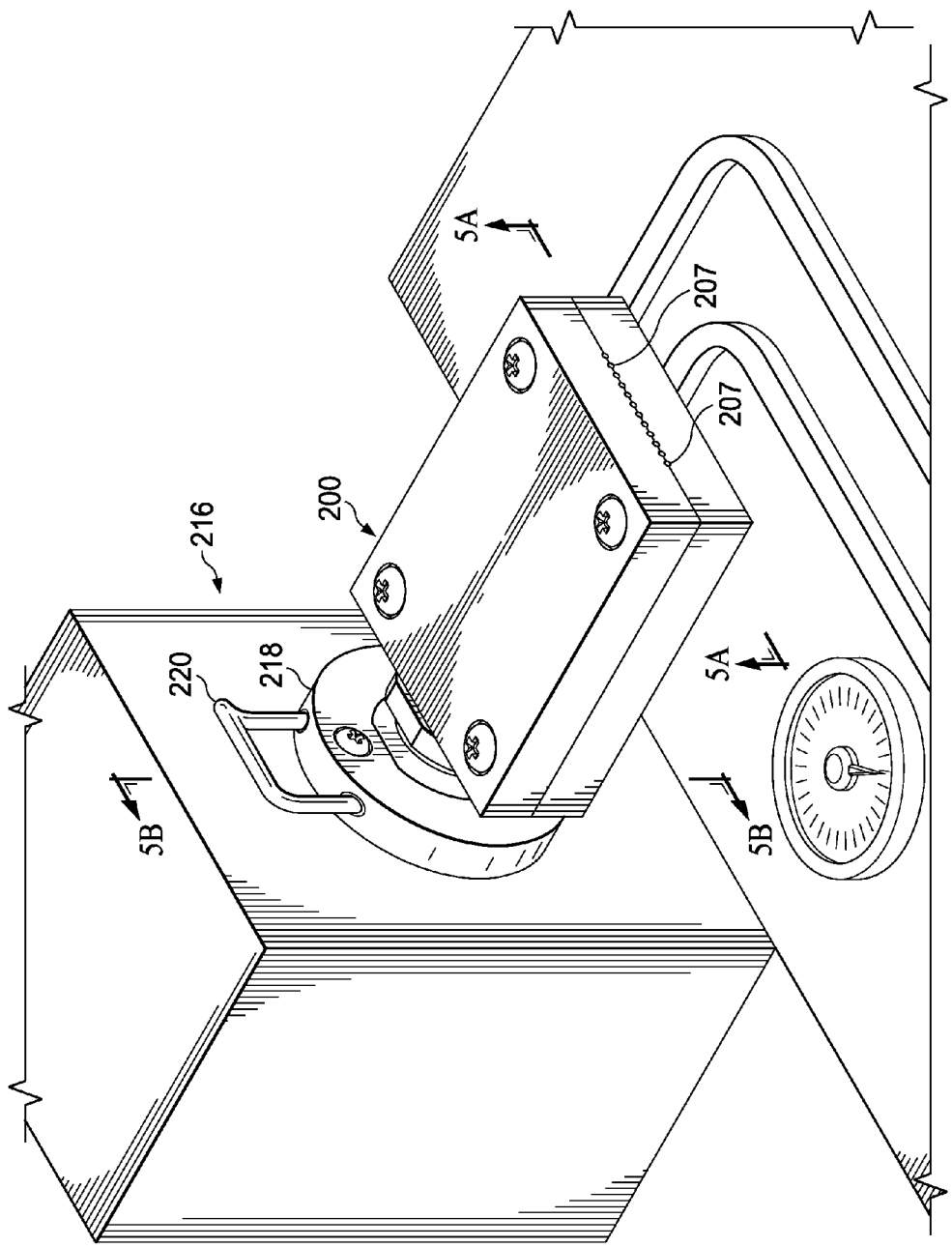
FIG. 4 is a perspective view of the inlet guide of FIG. 2 in association with a feeding unit.

FIG. 4 is a perspective view illustrating the inlet guide 200 coupled to a feeding unit 216 with the head 202 of the inlet guide 200 inserted into the feeding unit 216. The plurality of apertures 205 (FIG. 2) can be in fluid communication with ducts (not shown) that are associated with the feeding unit 216 and into which the optical fibers can be installed (e.g., through blowing). In one embodiment, the inlet guide 200 can be retained to the feeding unit 216 with a ring 218 having a u-shaped member 220 provided therethrough that can be selectively installed into the ring 218 to facilitate coupling of the inlet guide 200 thereto. When the u-shaped member 220 is installed in the ring 218, the u-shaped member 220 can be provided between annular flanges (217 in FIG. 2) to retain the inlet guide 200 to the feeding unit 216. When the u-shaped member 220 and the inlet guide 200 are removed, the ring 218 can remain in place. In another embodiment, the inlet guide 200 can include a flange that can be releasably secured to the feeding unit 216 (e.g., with bolts).

Figure 5A:
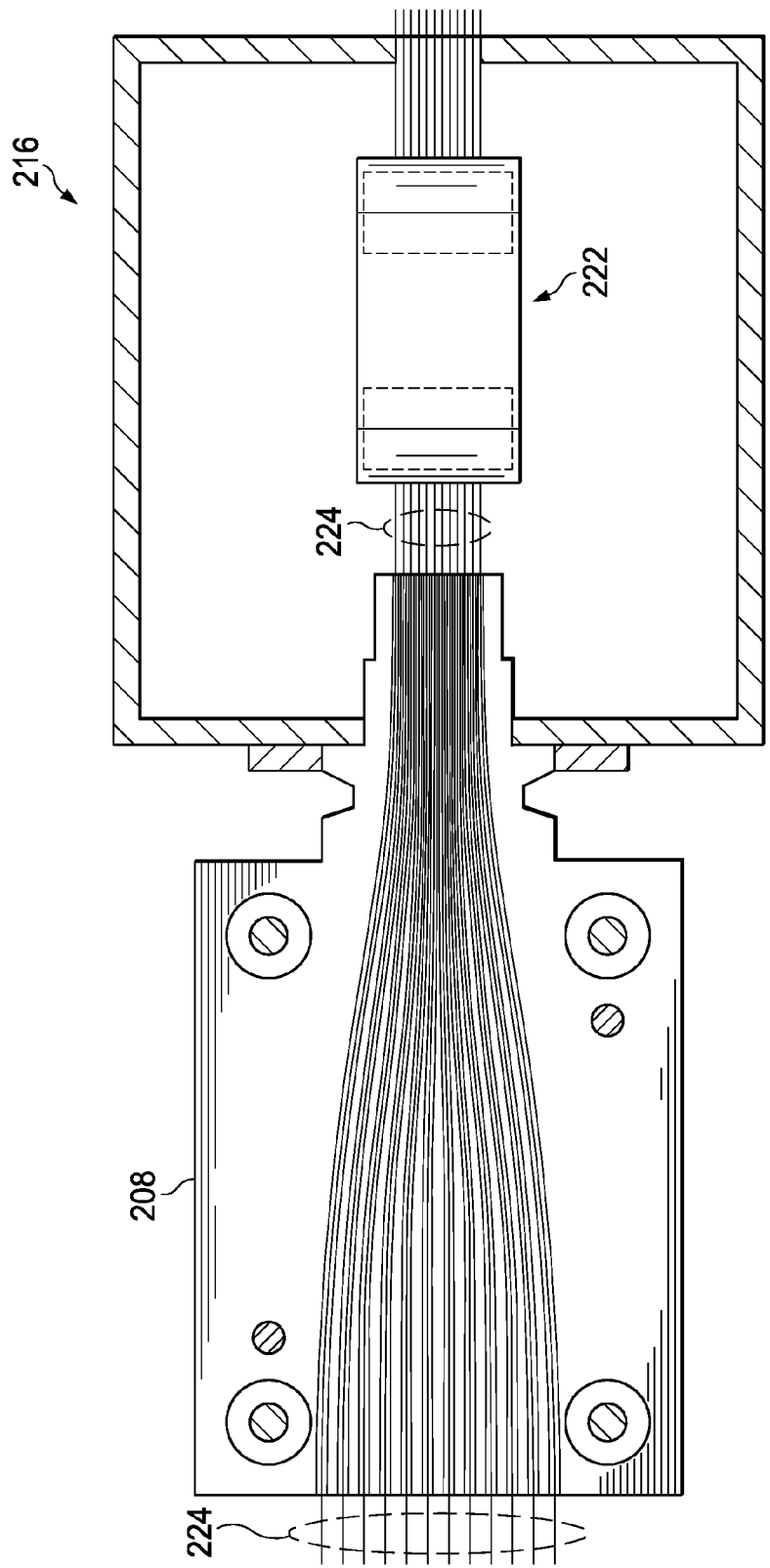
FIG. 5A is a cross sectional view of the inlet guide and feeding unit of FIG. 4 taken along the line 5A-5A in FIG. 4.
Figure 5B:
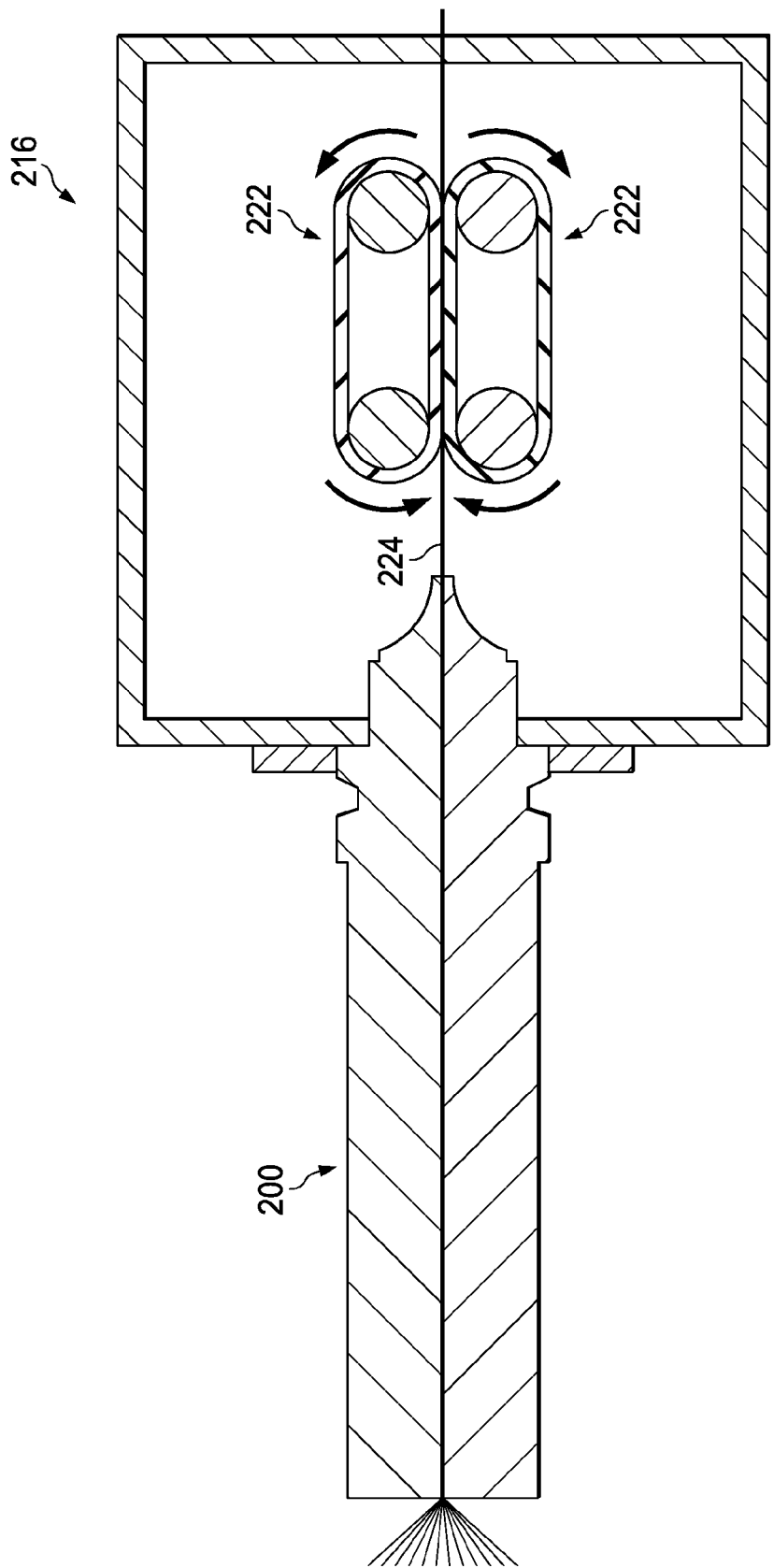
FIG. 5B is a cross sectional view of the inlet guide and feeding unit of FIG. 4 taken along the line 5B-5B in FIG. 4.

As illustrated in FIGS. 5A and 5B, the feeding unit 216 can include a pair of feed rollers (e.g., 222) that urge optical fibers 224 through the inlet guide 200 and along the passageways that are defined by the grooves 212, 214. Once the optical fibers 224 are routed through the inlet guide 200, the pair of rollers 222 can continue to operate in conjunction with forced air to urge the optical fibers 224 into the ducts (not shown).

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. An inlet guide for facilitating distribution of optical fibers into at least one duct, the inlet guide comprising:
   a first portion comprising a first opposing surface;
   a second portion comprising a second opposing surface and being separable from the first portion;
   a first end;
   a second end;
   a head disposed at the first end and comprising an outlet port from which optical fibers can be dispensed; and
   a main body disposed at the second end and comprising a reception port into which optical fibers can be received, wherein:
   the first portion and the second portion cooperate to define a plurality of passageways for the optical fibers;
   each passageway of the plurality of passageways extends between the reception port and the outlet port; and
   each passageway of the plurality of passageways is separate from the other passageways such that each optical fiber disposed in any passageway is isolated from the other optical fibers disposed in the other passageways between the reception port and the outlet port.

2. The inlet guide of claim 1, wherein the plurality of passageways collectively tapers from the second end to the first end.

3. The inlet guide of claim 1, further comprising a plurality of fasteners for releasably fastening the first portion and the second portion together.

4. The inlet guide of claim 3, wherein the plurality of fasteners comprises one or more of a screw and a bolt.

5. The inlet guide of claim 1, wherein the first portion and the second portion are each formed from aluminum.

6. The inlet guide of claim 1, wherein the first portion and the second portion each define a plurality of grooves that cooperate to define the plurality of passageways.

7. The inlet guide of claim 1 wherein the first portion and the second portion are each formed of a unitary one-piece construction.

8. A system for facilitating distribution of optical fibers into at least one duct, the system comprising:
   a feeding unit for guiding the fibers into the ducts; and
   an inlet guide coupled to the feeding unit and configured to receive a plurality of fibers, the inlet guide comprising:
   a first portion comprising a first opposing surface;
   a second portion comprising a second opposing surface and being separable from the first portion;
   a first end;
   a second end;
   a head disposed at the first end and comprising an outlet port from which optical fibers can be dispensed; and
   a main body disposed at the second end and comprising a reception port into which optical fibers can be received, wherein:
   the first portion and the second portion cooperate to define a plurality of passageways for the optical fibers;

each passageway of the plurality of passageways extends between the reception port and the outlet port; and each passageway of the plurality of passageways is separate from the other passageways such that each optical fiber disposed in any passageway is isolated from the other optical fibers disposed in the other passageways between the reception port and the outlet port.

9. The system of claim 8, wherein the plurality of passageways collectively tapers from the second end to the first end.

10. The system of claim 8, further comprising a plurality of fasteners for releasably fastening the first portion and the second portion together.

11. The system of claim 10, wherein the plurality of fasteners comprises one or more of a screw and a bolt.

12. The system of claim 8, wherein the first portion and the second portion are each formed from aluminum.

13. The system of claim 8, wherein the first portion and the second portion each define a plurality of grooves that cooperate to define the plurality of passageways.

14. The system of claim 8, wherein the first portion and the second portion are each formed of a unitary one-piece construction.

15. An inlet guide for facilitating distribution of optical fibers into at least one duct, the inlet guide comprising:
a first portion comprising a first opposing surface;
a second portion comprising a second opposing surface and being separable from the first portion;
a first end;
a second end;
a head disposed at the first end and comprising an outlet port from which optical fibers can be dispensed; and
a main body disposed at the second end and comprising a reception port into which optical fibers can be received, wherein:
the first portion and the second portion cooperate to define a plurality of passageways for the optical fibers;
each passageway of the plurality of passageways extends between the reception port and the outlet port;
each passageway of the plurality of passageways is separate from the other passageways such that each optical fiber disposed in any passageway is isolated from the other optical fibers disposed in the other passageways;
the plurality of passageways collectively tapers from the second end to the first end; and
the first portion and the second portion are each formed of a unitary one-piece construction.

16. The inlet guide of claim 15, further comprising a plurality of fasteners for releasably fastening the first portion and the second portion together.

17. The inlet guide of claim 16, wherein the plurality of fasteners comprises one or more of a screw and a bolt.

18. The inlet guide of claim 15, wherein the first portion and the second portion are each formed from aluminum.

19. The inlet guide of claim 15, wherein the first portion and the second portion each define a plurality of grooves that cooperate to define the plurality of passageways.

20. The inlet guide of claim 15, wherein the plurality of grooves comprises a plurality of machined grooves.

\* \* \* \* \*

UNITED STATES PATENT AND TRADEMARK OFFICE
CERTIFICATE OF CORRECTION

PATENT NO.      : 9,250,392 B2
APPLICATION NO. : 14/537008
DATED           : February 2, 2016
INVENTOR(S)     : Michael J. Burke et al.

It is certified that error appears in the above-identified patent and that said Letters Patent is hereby corrected as shown below:

In the Claims
Claim 20, column 6, line 28, change "claim 15" to --claim 19--.

Signed and Sealed this
Twenty-third Day of August, 2016

Michelle K. Lee
*Director of the United States Patent and Trademark Office*